United States Patent

[11] 3,558,905

[72] Inventors Shintaro Oshima;
Teruji Watanabe, Tokyo-to, Japan
[21] Appl. No. 725,300
[22] Filed Apr. 30, 1968
[45] Patented Jan. 26, 1971
[73] Assignee Kokusai Denshin Denwa Kabuskiki Kaisha
Tokyo-to, Japan
a joint-stock company of Japan
[32] Priority May 2, 1967, May 2, 1967
[33] Japan
[31] 42/27678 and 42/27679

[54] FAIL-SAFE LOGICAL SYSTEM
5 Claims, 14 Drawing Figs.

[52] U.S. Cl. .......... 307/88, 307/204, 328/92
[51] Int. Cl. .......... H03k 19/162, H03k 19/40
[50] Field of Search .......... 328/92, 94; 307/204, 219, 88; 340/174; 235/153

[56] References Cited

UNITED STATES PATENTS

| | | | |
|---|---|---|---|
| 3,015,039 | 12/1961 | Morgan | 307/88 |
| 3,122,724 | 2/1964 | Felton et al. | 340/174 |
| 3,162,769 | 12/1964 | Yamada | 307/88 |
| 3,016,517 | 1/1962 | Saltzberg | 307/204X |
| 3,201,701 | 8/1965 | Maitra | 328/92X |
| 3,226,569 | 12/1965 | James | 307/204 |
| 3,305,830 | 2/1967 | Constantine, Jr. | 307/204X |
| 3,421,018 | 1/1969 | Martin | 328/92X |

*Primary Examiner*—Stanley M. Urynowicz, Jr.
*Attorneys*—Robert E. Burns and Emmanuel J. Lobato

ABSTRACT: A fail-safe logical system for performing general logical functions and for generating a predetermined logical output in case of fault of any element of any elemental circuit, wherein an 0-type input unit having an allowable failure-state of 0 and a 1 type input unit having an allowable failure-state of 1, are connected to a fail-safe logical unit which is formed by fail-safe logical elemental circuits in accordance with the principle of alternate, cascade circuit arrangement, before and after a NOT circuit, to provide logical elemental circuits having different allowable failure-states.

PRIOR ART

PRIOR ART

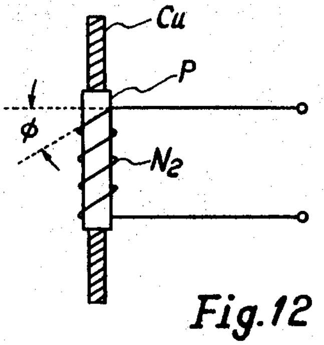
Fig. 12
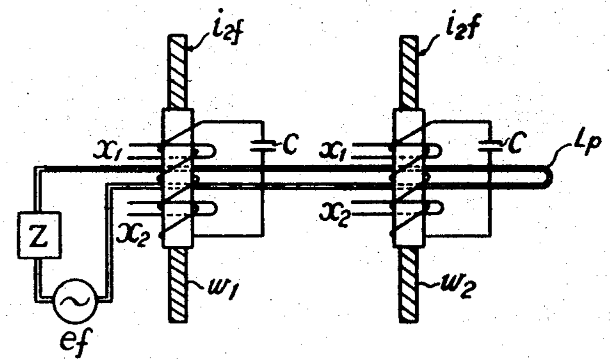
Fig. 13
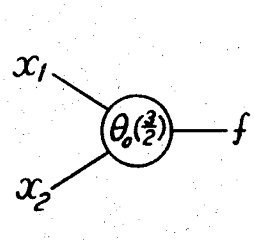
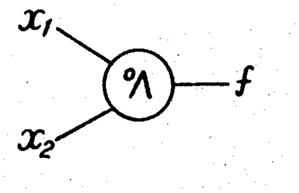
Fig. 14(A) Fig. 14(B)

FAIL-SAFE LOGICAL SYSTEM

This invention relates to fail-safe logical systems for generating a predetermined logical output in case of fault of any element.

A digital logical system can be generally formed by use of elemental logical circuits, such as OR circuits, NOT circuits and AND circuits. In logical systems such as a data-processor or a control device operating in real time, a control device for atomic furnace or a control device for locomotion, in which an extremely high safety standard of devices is required to avoid a loss of human life, fail-safe logical systems generating a predetermined safe output in case of a fault of any element is necessary. However, if the logical system comprises binary circuits and if any element in the binary circuit causes a binary fault, such as "open-state" or "short-state," the logical outputs 1 and 0 will be generated under equal probabilities. Accordingly, it cannot be clearly foreseen what output result is obtained from the logical system in a case of fault. A conventional fail-safe system had been proposed to eliminate the above-mentioned instability of output result in case of fault of any element. However, since the conventional fail-safe logical system is formed by only logical circuits having an allowable failure-state 0 only, they can perform only logical functions restricted within narrow limits.

An object of this invention is to provide fail-safe logical systems performable of general logical functions.

Said object and other objects of this invention can be attained by the fail-safe logical system of this invention, characterized in that double systems comprising an 0-typed input unit having an allowable failure-state 0 only and an 1-typed input unit failed into an allowable failure-state 1 only are connected to at least one fail-safe logical unit which is formed by fail-safe logical elemental circuits. According to further feature of this invention, the fail-safe logical unit is formed under "the principle of alternate, cascade circuit arrangement" in which before and after a NOT circuit, logical circuits having different allowable failure-states are alternately arranged.

The principle of this invention will be better understood from the following more detailed discussion in conjunction with the accompanying drawings, in which FIG. 1 is a block diagram for illustrating an example of conventional logical system;

Figure 10:
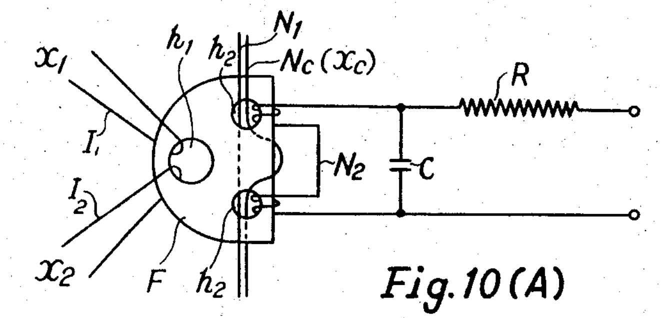
Figure 10:
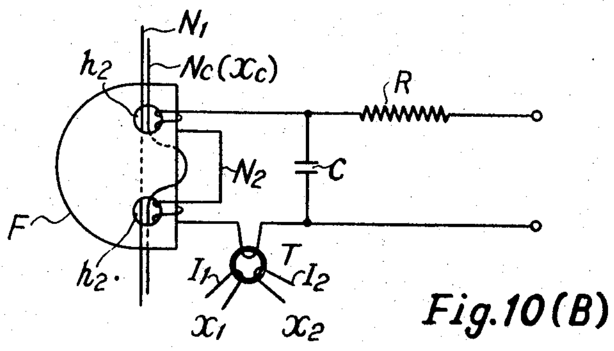
Figure 11:
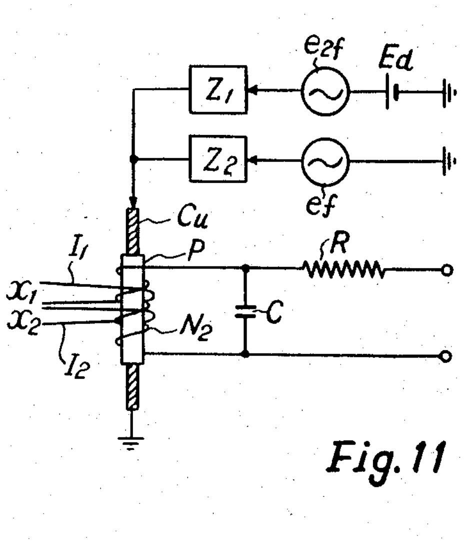

FIGS. 10 (A), 10 (B) and 11 are connection diagrams each for illustrating another example of fail-safe parametron element to be employed in the system of this invention;

FIG. 12 is a connection diagram for describing the operation of the parametron element shown in FIG. 11;

FIG. 13 is a connection diagram for illustrating other examples of fail-safe parametron elements to be employed in the system of this invention; and FIGS. 14 (A) and 14 (B) are block diagrams for describing the constructive principle of an elemental circuit to be employed in the system of this invention.

To simplify the following descriptions, it is assumed that we actually obtain a 0-typed fail-safe logical circuit which performs the prime logical operation thereof in the normal condition but generates always an allowable logical output 0 only in a case of "open" or "short" fault of any element and a 1-typed fail-safe logical circuit which performs the prime logical operation thereof in the normal condition but generates always an allowable logical output 1 only in a case of "open" or "short" fault of any element. At first, a complete fail-safe system using the above-mentioned 0-typed and 1-typed fail-safe logical circuits will be described. Actual examples of the fail-safe logical circuits will next be described. Notations used in the following descriptions and drawings are as follows:

V: OR circuit
Λ: AND circuit
N: NOT circuit
$^0V_i$: an i-th "O"-typed OR circuit having an allowable failure state "O" only
$^1V_i$: an i-th "1"-typed OR circuit having an allowable failure state "1" only
$^0\Lambda_i$: an i-th "O"-typed AND circuit having an allowable failure state "O" only
$^1\Lambda_i$: an i-th "1"-typed AND circuit having an allowable failure state "1" only
$^0N_i$: an i-th NOT circuit failed into the state "O"
$^1N_i$: an i-th NOT circuit failed into the state "1"

In the above notations, the numbers "i" are consecutively given from the output side. Moreover, references $x_1$, $x_2$, $f$,—are input or output variables and references $^0x_1$, $^1x_2$,—are variables having respective allowable failure-states 0 and 1 only.

To make the features of this invention clear, an example of conventional logical system will first be described with reference to FIG. 1. This example is formed to perform a logical function $f = x_1x_2 + \overline{(x_1+x_2)}$. As mentioned hereinbefore, since the logical outputs 1 and 0 are generated under equal probability if any element in elemental logical circuits causes a binary fault, it cannot be clearly foreseen what output result is obtained from the system in a case of fault.

Figure 1:
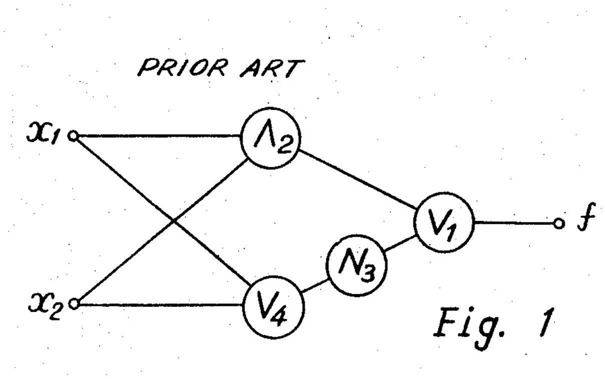
Figure 2:
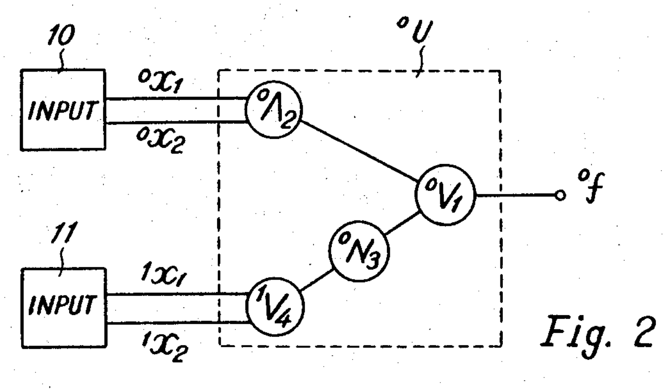
FIGS. 2 and 3 are block diagrams each for illustrating an embodiment of this invention performing the same function as example shown in FIG. 1.

FIG. 2 shows an embodiment of this invention, which performs the same function as the system shown in FIG. 1 and comprises a 0 only typed input unit 10 having an allowable failure-state 0, a 1 only typed input unit 11 failed into the state 1 and a logical unit $^0U$. The input units 10 and 11 are designed so as to perform the same function. Elemental logical circuits are all fail-safe elemental logical circuit described below. Moreover a 0-typed logical circuit $^0V_1$ and a 1-typed logical circuit $^1V_4$ are arranged alternately in cascade after and before a NOT circuit $^0N_3$. We will hereinafter refer this principle (at least one 0-typed logical circuit and at least one 1-typed logical circuit are arranged alternately in cascade after and before a NOT circuit for each single path from the output terminal to an input terminal) as "the principle of alternate in cascade arrangement."

The embodiment of FIG. 2 is formed to obtain the output state 0 in a case of fault of any element in the elemental units or circuits 10, 11, $\Lambda_2$, $V_1$, $N_3$ and $V_4$. To obtain this output state 0, the OR circuit $V_1$ comprises a logical circuit $^0V$having an allowable failure-state 0 only, the AND circuit $\Lambda_2$comprises a logical circuit $^0\Lambda_2$having an allowable failure-state O only, and the NOT circuit $N_3$ comprises a logical circuit $^0N_3$ having an allowable failure-state O only. However, since the NOT circuit $^0N_3$ has to have the input state 1 to obtain its output state 0 in case of fault of the immediately preceding logical circuit $V_4$, this logical circuit $V_4$ comprises a logical circuit having an allowable failure-state 1 only. In other words, the logical circuits arranged before and after the NOT circuit $^0N_3$ are required to have respectively different allowable failure-states 1 and 0. In a case where a plurality of NOT circuits are employed to form a logical unit, they are assigned so that different failure-states 1 and 0 are arranged alternately before and after each NOT circuit. Moreover, the O-typed input unit 10 is connected to the 0-typed logical circuit $^0\Lambda_2$, and the 1-typed input unit 11 is connected to the 1-typed logical circuit $^1V_4$.

As the result of the above formation, the logical output of the embodiment shown in FIG. 2 becomes always the state 0 in a case of fault of any element in the logical unit $^0U$ and in the input units 10 and 11. If respective failure-states of the elemental circuits $V_1, \Lambda_2$, $N_3$ and $V_4$ and the units 10 and 11 are all replaced by different failure-states, the embodiment of FIG. 2 becomes a 1-typed logical system.

Figure 3:
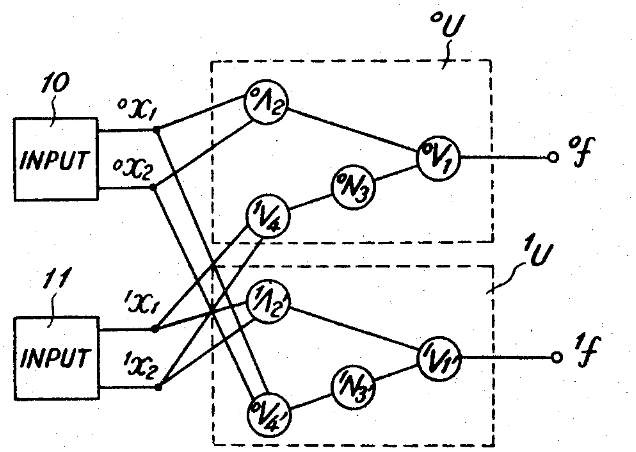

FIG. 3 shows another embodiment of this invention which are a fail-safe double logical system. In this embodiment, the O-typed input unit 10 and the 1-typed input unit 11 and the logical unit $^0U$ are the same as shown in FIG. 2. A logical unit $^1U$ is designed so as to perform the same logical function as that of the logical unit $^0U$ but to obtain a logical output 1*f* in a case of fault of any elemental logical circuits in this logical unit $^1U$. In this logical unit $^1U$, the forementioned "the principle of alternate in cascade arrangement" is adopted before and after a NOT circuit $^1N_{3'}$. The input unit 10 and the logical unit $^0U$ are of O-type and the input unit 11 and the logical unit $^1U$ are of 1-type. Moreover, a combination of the input unit 10 and the logical unit $^0U$ and a combination of the input unit 11 and the logical unit $^1U$ are designed so as to perform the same logical operation. Accordingly, this embodiment is a complete double system for fail-safe logical operation.

The principle of this invention can be applied to form a fail-safe sequential circuit.

Figure 4:
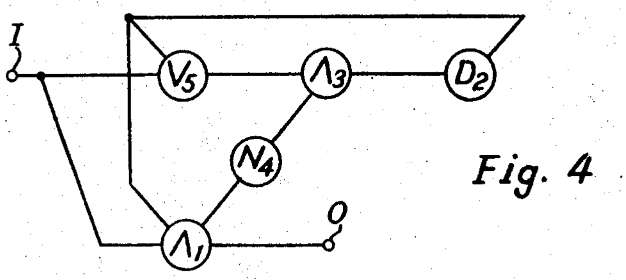
FIG. 4 is a block diagram for illustrating an example of conventional sequential circuits.

FIG. 4 shows an example of conventional sequential circuit which is a flip-flop circuit of trigger type. In this example, a delay circuit $D_2$ has a delay time equal to the period of input pulses applied from the input terminal I. When two input pulses of the state 1 are applied from the input terminal I, an output pulse of the state 1 is obtained from an output terminal 0.

Figure 5:
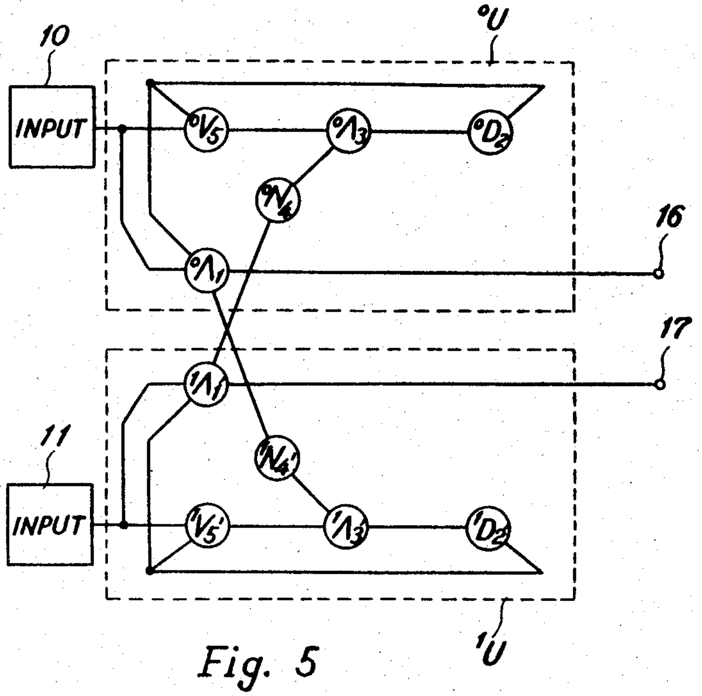
FIG. 5 is a block diagram for illustrating an embodiment of this invention performing the same function as the example shown in FIG. 4.

FIG. 5 shows another embodiment of this invention which is designed to perform the same logical operation as that of the conventional logical circuit shown in FIG. 4. In this embodiment, the principle of alternate in cascade arrangement is adopted before and after each of NOT circuits $^0N_4$ and $^1N_{4'}$. Logical units $^0U$ and $^1U$ perform the same logical operations and are respectively of a O-typed logical circuit and of a 1-typed logical circuit.

The normal operation of this embodiment will first be described. If pulses of the state 1 are simultaneously applied, respectively, to the input side of the 0-typed logical unit $^0U$ and the input side of the 1-typed logical unit $^1U$ in a case where flip-flop circuits of units $^0U$ and $^1U$ are reset, these pulsive information of the state 1 are passed through, respectively, OR circuits $^0V_5$ and $^1V_5$ and circulate in respective loops formed by elemental circuits $^0V_5 - {}^0\Lambda_3 - {}^0D_2 - {}^0V_5$ and by elemental circuits $^1V_5 - {}^1\Lambda_{3'} - {}^1D_2 - {}^1V_5$. When next pulses of the state 1 are simultaneously applied, respectively, to the input sides of the logical units $^0U$ and $^1U$, a pulse of the state 1 is obtained from each of output terminals 16 and 17 since the circulating pulses of the state 1 are respectively applied to AND circuits $^0\Lambda_1$ and $^1\Lambda_{1'}$. These output pulses of the state 1 are simultaneously applied, respectively, to NOT circuits $^1N_4$ and $^0N_4$ and then applied after NOT, respectively, to AND circuits $^1\Lambda_{3'}$ and $^0\Lambda_3$. Since pulses applied from the NOT circuits $^1N_4$ and $^0N_4$ are of the state 0, both the outputs of the AND circuits $^1N_3$ and $^0\Lambda_3$ assume the state O and the pulses of the state 1 circulating in the respective loops are reset. Accordingly, the respective flip-flop circuits are changed from the state O or 1 to the state 1 or 0 for each application of the pulse signal of the state 1. In this case, the same outputs are obtained from the O-typed logical unit $^0U$ and the 1-typed logical unit $^1U$.

If the O-typed input unit 10 is failed in the system shown in FIG. 5, the input pulse of the unit $^0U$ assumes always the state 0. Accordingly, the output of the unit $^0U$ assumes the state 0. If any element of the elemental circuits of the unit $^0U$ is failed, the output of the unit $^0U$ assumes also the state 0 since all the elemental circuits are failed into the state 0 as shown in FIG. 5 O of references of respective elemental circuits. If the 1-typed input system and/or the unit $^1U$ are/is failed, the output of the unit $^1U$ assumes the state 1. In a case where one or more fault occurs or occur in each of the logical systems (10, $^0U$) and (11, $^1U$), the 0-typed system (10, $^0U$) will generate the output of the state 0 and the 1-typed system (11, $^1U$) will generate the output of the state 1. By way of example, if the AND circuit $^1\Lambda_1$ is failed, the output of this a AND circuit $^1\Lambda_1$ assumes the state l. Since this pulse of the state 1 is applied, after NOT, to the input of the AND circuit $^0\Lambda_3$, the output of the AND circuit $^1\Lambda_1$ assumes the state 0. Accordingly, the 0-typed logical system and the 1-typed logical system generate respectively the output of the state 0 and the output of the state 1. As understood from the above description, this sequential circuit meets conditions and requirements for a complete fail-safe logical system.

Figure 6:
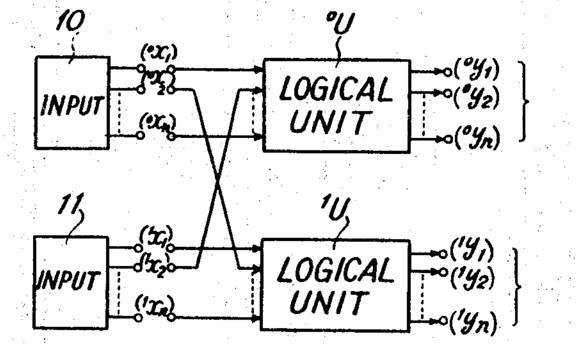
FIG. 6 is a block diagram for describing the constructive principle of the system of this invention.

With reference to FIG. 6, the constructive principle of a complete fail-safe logical system of this invention including the above-mentioned combination circuits and sequential circuits will be described. The complete fail-safe logical system comprises a 0-typed input unit 10 having an allowable failure-state 0 only, a 1-typed input unit 11 having an allowable failure-state 1 only, a 0-typed logical unit $^0U$ having an allowable failure-state 0 only, and a 1-typed logical unit $^1U$ having an allowable failure-state 1 only. The 0-typed input unit 10 and the 0-typed logical unit $^0U$ generate respective normal outputs in the normal condition while generate always the output 0 only in a case of fault of any element of their elemental circuits. On the other hand, the 1-typed input unit 11 and the 1-typed logical unit $^1u$ generate normal outputs in the normal condition while always the output 1 only in a case of fault of any element of their elemental circuits. To realize each of the O-typed units and the 1-typed units, the forementioned principle of alternate in cascade arrangement is applied. In a case where general logical functions are to be performed, each elemental circuit of the logical unit $^0U$ may require the opposite failure-state 1. In such a case, a required failure-state is obtained from a required elemental circuit (e.g.; $^1\Lambda_{1'}$ in FIG. 5) of the other logical unit $^1U$ and applied to the requiring elemental circuit (e.g.; $^0N_4$ in FIG. 5) of the logical unit $^0U$. Such requirement may occur also in the 1-typed logical unit $^1U$. In this case, a required failure-state is obtained from a required elemental circuit (e.g.; $^0\Lambda_1$ in FIG. 5) of the logical unit $^0U$ and applied to a requiring elemental circuit (e.g.; $^1N_4$ in FIG. 5 of the logical unit $^1U$. This complete fail-safe logical system comprises double logical systems (10 and $^0U$) and (11 and $^1U$) which perform the same function and have dual relationship with respect to the allowable failure-states 0 and 1.

Figure 7:
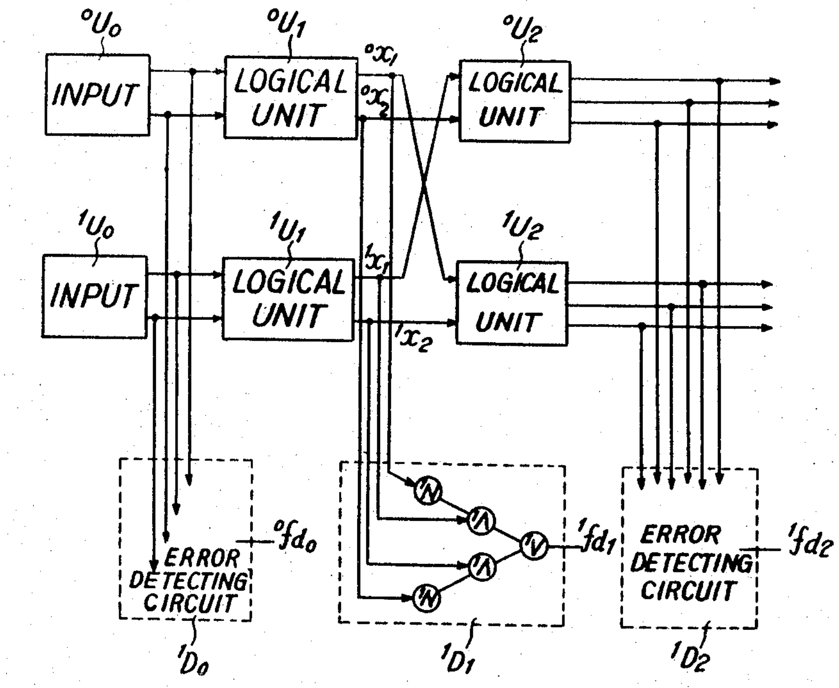
FIG. 7 is a block diagram for illustrating an embodiment of this invention providing with error detecting function.

With reference to FIG. 7, another embodiment of this invention having error detecting function will be described. In this embodiment, the error detecting circuit is designed so as to have "fail-safe function." This embodiment is elementally formed into double logical systems ($^0U_0$, $^0U_1$ and $^0U_2$) and ($^1U_0$, $^1U_1$ and $^1U_2$ under the same constructive principle as described with reference to FIG. 6. Error detection is carried out by comparing outputs of corresponding two units of the two logical systems ($^0U_0$, $^0U_1$ and $^0U_2$) and ($^1U_0$, $^1U_1$ and $^1U_2$) with each other. By way of example, the error detecting circuit $^1D_1$ detecting errors of the O-typed logical unit $^0U_1$ and a 1-typed logical unit $^1U_1$ detects whether or not the following logical function is correctly performed:

$$^1f_{d1} = {}^0\bar{x}_1 \cdot {}^1x_1 + {}^0\bar{x}_2 \cdot {}^1x_2$$

If both the two systems generate the output state 0 or 1, two systems operate in the normal condition. Therefore, the logical function $^1f_{d1}$ assumes the value 0. However, if any element of the O-typed unit $^0U_1$ is failed, at least one output of the unit $^0U_1$ assumes the state 0. On the contrary, any element of the 1-typed unit $^1U_1$ is failed, at least one output of the unit $^1U_1$ assumes the state 1. Accordingly, the logical function $^1f_{d1}$ assumes a value 1. If the number of outputs is a number n, an error detecting circuit of fail-safe is added to perform the following function with respect to respective pair of outputs of the Ottyped logical unit and the 1-typed logical unit:

$$^{1}f_{d}=\sum_{1}^{n}{}^{0}x_{i}\cdot{}^{1}x_{i}$$

where the notation Σ indicates logical sum. The error detecting circuit $^{1}D_{1}$ is an example formed into a 1-typed fail-safe circuit generating always the output 1 only in a case of fault of any element therein.

Elemental fail-safe logical circuits employed to form the above-mentioned complete fail-safe logical systems will now be described in comparison with conventional elemental logical circuits.

Figure 8:
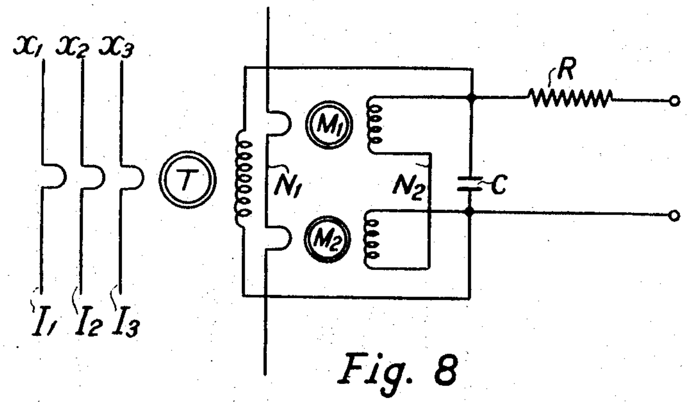
FIG. 8 is a connection diagram for illustrating an example of conventional parametron element.

FIG. 8 shows an example of a conventional parametron element. let's discuss conditions of this element in a case of fault of any constructive means in comparison with those in the normal condition. This element comprises two magnetic cores $M_1$ and $M_2$ with nonlinear characteristic, an oscillation circuit composed of a capacitor C and an oscillation winding $N_2$ on the cores $M_1$ and $M_2$ and tuning with a frequency $f$, an exciting winding $N_1$ for parametrically exciting the oscillation circuit with a frequency $2f$, input windings $I_1$, $I_2$ and $I_3$, and an input transformer T for applying, to the oscillation circuit, input signals $x_1$, $x_2$ and $x_3$ supplied from the input winding $I_1$, $I_2$ and $I_3$. The exciting winding $N_1$ has usually one number of turn, and the oscillation winding $N_2$ has usually 10 number of turns. The excitation winding $N_1$ and the oscillation winding $N_2$ are wound on the cores $M_1$ and $M_2$, under the principle of so-called orthogonal relationship, to avoid direct coupling therebetween. In case of this illustration, the windings $N_2$ comprises two coils connected in opposite senses. A resistor R is employed to couple the output of this element to a succeeding element. Under these construction, if the excitation current of the frequency $2f$ is applied to the excitation winding $N_1$ in a case where the input signals $x_1$, $x_2$ and $x_3$ are respectively applied to the input windings $I_1$, $I_2$ and $I_3$, the oscillation circuit generates an oscillation signal with the frequency $f$ and a phase position (0 or $\pi$) determined in accordance with decision by majority with respect to phase-positions of the input signals. Accordingly, the binary digits 0 and 1 are represented by the phase-positions 0 and $\pi$ in this parametron element.

If the excitation current stops in this parametron element by way of example, the parametric oscillation in the oscillation circuit is stopped. However, if any one of the input signals stops in response to the breaking of any input winding or the oscillation stop of the immediately preceding element, this parametron element will receive only two input signals. In this case, if the two input signals have the same phase-position 0 or $\pi$, this parametron will generates an output signal with the phase-position 0 or $\pi$. However, if the two input signals have opposite phase-positions, this parametron element will have substantially no input signal. In this case, this parametron element generates an output signal with a random phase-position (0 or $\pi$) determined by the initial phase-position of noise. In a logical circuit using these conventional parametron elements, it is very difficult to know what element or means is failed since we cannot predetermine the failure-state (e.g.; the state of the output signal) caused by fault of any means of the parametron element.

Figure 9:
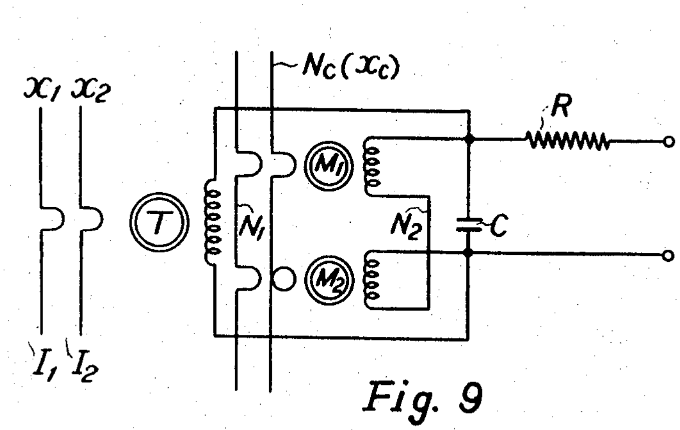
FIG. 9 is a connection diagram for illustrating an example of fail-safe parametron element to be employed in the system of this invention.

FIG. 9 shows an example of a fail-safe logical circuit to be used in the system of this invention. In this example, an even number of input windings ($I_1$ and $I_2$) are employed, and a constant winding $N_c$ is coupled through the same apertures of the cores $M_1$ and $M_2$ as the excitation winding $N_1$. In this case, the constant winding $N_c$ and the oscillation winding $N_2$ have opposite senses with respect to the core $M_2$ so that the constant winding $N_c$ has linear coupling with the oscillation winding $N_2$ and has not linear coupling with the excitation winding $N_1$. Moreover, if it is assumed that the effective intensity of magnetic field applied to the cores $M_1$ and $M_2$ by input signals $x_1$ and $x_2$ flowing through the input windings $I_1$ and $I_2$ is equal to a value l, the intensity of magnetic field applied to the cores $M_1$ and $M_2$ by a constant signal $x_c$ flowing through the constant winding $N_c$ is determined so as to be larger or smaller than the value l. The magnetic field applied to the cores $M_1$ and $M_2$ by the constant signal $x_c$ flowing through the constant winding $N_c$ has two possible phase-positions $\theta_0$ and $\pi\pi$. The magnetic fields caused by constant signals $x_c$ having any of the two possible phase-positions $\theta_0$ and $\theta\pi$ and having one half or three halves the input signals are respectively represented by references $\theta_0(½)$, $\theta\pi(½)$, $\theta_0(3/2)$ and $\theta\pi\,(3/2)$. In accordance with the similar notation, the magnetic field applied to the cores $M_1$ and $M_2$ by the input signals $x_1$ and $x_2$ is represented by a reference $\theta_0(1)$ or $\theta\pi(1)$. If it is assumed that the magnetic field $\theta_0(3/2)$ is applied to the cores $M_1$ and $M_2$ by the constant signal $x_c$, the parametron element of FIG. 9 becomes an 0-typed AND circuit having an allowable failure-state 0 only. In other words, this parametron element generates the output signal of the phase $\theta\pi$ only when the input signals $x_1$ and $x_2$ generate magnetic field $\theta\pi(1)$, and this generates the output of the phase $\theta_0$ in other all cases. To make conditions of this parametron element clear, combinations of phase-positions and intensities of the input signals $x_1$ and $x_2$ and the output signal Z in cases of normal and failed states are shown in Table 1 where references $\theta\pi$ and $\theta_0$ are assumed as logical digits 1 and 0 respectively.

TABLE 1

| $x_1$ | $x_2$ | Z | Reference Number |
|---|---|---|---|
| Operations in normal states: | | | 1 |
| $\theta_0$ (1) | $\theta_0$ (1) | $\theta_0$ (1) | 2 |
| $\theta_0$ (1) | $\theta_\pi$ (1) | $\theta_0$ (1) | 3 |
| $\theta_\pi$ (1) | $\theta_0$ (1) | $\theta_0$ (1) | 4 |
| $\theta_\pi$ (1) | $\theta_\pi$ (1) | $\theta_\pi$ (1) | |
| Operations in failure states: | | | |
| $\theta_0$ (1) | $\gamma$ | $\theta_0$ (1) | 5 |
| $\theta_\pi$ (1) | $\gamma$ | $\theta_0$ (1) | 6 |
| $\gamma$ | $\theta_0$ (1) | $\theta_0$ (1) | 7 |
| $\gamma$ | $\theta_\pi$ (1) | $\theta_0$ (1) | 8 |
| $\gamma$ | $\gamma$ | $\theta_0$ (1) | 9 |
| $\theta_0$ (1) | $\theta_0$ (1) | $\gamma$ | 10 |
| $\theta_0$ (1) | (1) | $\gamma$ | 11 |
| $\theta_\pi$ (1) | $\theta_0$ (1) | $\gamma$ | 12 |
| $\theta_\pi$ (1) | $\theta_\pi$ (1) | $\gamma$ | 13 |
| $\theta_0$ (1) | $\gamma$ | $\gamma$ | 14 |
| $\theta_\pi$ (1) | $\gamma$ | $\gamma$ | 15 |
| $\gamma$ | $\theta_0$ (1) | $\gamma$ | 16 |
| $\gamma$ | $\theta_\pi$ (1) | $\gamma$ | 17 |
| $\gamma$ | $\gamma$ | $\gamma$ | 18 |

In this Table 1, a reference $r$ represents the state of no output signal (nonoscillation). From the contents of Table 1, it will be understood that the 0-typed fail-safe AND circuit having the allowable fail-state 0 only performs its correct operation or, in a case of fail-state of any one of input means, excitation means and other constructive means, generates an output Z having a phase-position $\theta_0$ or becomes no oscillation condition. In this parametron element, it is assumed that the constant winding $N_c$ is not absolutely failed. If this requirement is met in this parametron element, this element operates in any of combinations shown in Table 1 in such failure-states as open or short of the input winding $x_1$ or $x_2$, open or short of the excitation winding $N_1$, the crack of the input cire T, open or short of the winding on the input core T, open or short of the oscillation winding $N_2$, the crack of the core $M_1$ or $M_2$, and open or short of the capacitor C or the resistor R etc.

FIG. 10 (A) shows another fail-safe parametron element using multiaperture core F in accordance with the same principle as mentioned with reference to FIG. 9. In this example, the core F is provided with, separately, an aperture $h_1$ for input windings $I_1$ and $I_2$ and two apertures $h_2$ for a constant winding $N_c$. The constant winding $N_c$ is passed through the apertures $h_2$ as shown so that the constant winding $N_c$ couples directly with the oscillation winding $N_2$ and indirectly (orthogonally) with the excitation winding $N_1$. This element becomes a 0-typed fail-safe AND circuit having an allowable failure-state 0 only if the constant signal $x_c$ applied to the constant winding $N_c$ has a phase-position $\theta_0$ and an intensity equal to three halves (3/2) the intensity of input signals $x_1$ and $x_2$.

FIG. 10 (B) shows another example of a fail-safe parametron element, in which a core T is used to couple input windings $I_1$ and $I_2$ to the oscillation winding $N_2$ instead of the aperture $h_1$ in FIG. 10 (A).

FIG. 11 shows another example of a fail-safe parametron element using a magnetic wire which is a straight conductor Cu coated with ferromagnetic film P. In this element, magnetic fields caused by an excitation current and an oscillation current are intersected with each other at the magnetic wire. The excitation current $e_{2f}$ is applied, together with a direct current from a DC source Ed, through an impedance $Z_1$ to the straight conductor Cu. A constant current $e_f$ having a frequency $f$ is applied, as the constant current $x_c$, through a relatively large coupling impedance $Z_2$ to the straight conductor Cu. Since the oscillation winding $N_2$ is helically wound on the magnetic wire so as to have an angle $\phi$ with respect to the axial direction of the magnetic wire as shown in FIG. 12, the oscillation winding $N_2$ is coupled with fluxes of the excitation current $e_{2f}$ and the constant current $e_f$ by a component sine $\phi$ thereof. This parametron element meets the conditions for fail-safe, such as oscillation in a predetermined phase-position or non-oscillation, in a case of fault of the preceding element or of the breaking of any of input windings $I_1$ and $I_2$.

In this parametron element, the magnetization easy direction of the ferromagnetic film may be established in any of the circumference, axial or helical direction of the magnetic wire. In order to apply, to the oscillation winding $N_2$, the magnetic field caused by the constant current $e_f$, another magnetic wire other than the magnetic wire (Cu, P) may be provided so as to be connected to the impedance $Z_2$.

FIG. 13 shows other examples of fail-safe parametron elements in which a common magnetic field caused by a constant current $e_f$ is applied to oscillation windings of a plurality of parametron elements. In this illustration, the common magnetic field of the constant current $e_f$ is applied through an impedance Z and a loop line $L_p$ wound commonly on magnetic wires $W_1$ and $W_2$—of the parametron elements so as to intersect orthogonally with the magnetic wires $W_1$ and $W_2$. Effective magnetic fields caused by the constant current $e_f$ and applied to the magnetic wires $W_1$ and $W_2$ have an intensity substantially equal to one half (½) or three halves (3/2) the intensity of a magnetic field caused by input signals $x_1$ and $x_2$.

FIGS. 14 (A) and 14 (B) show functional notations of the above-mentioned fail-safe AND circuit. In FIG. 14 (A), a notation $\theta_0(3/2)$ represents a parametron element to which a constant current having an intensity (3/2) and a phase-position $\theta_0$ is applied. References $x_1$ and $x_2$ represent input signals having an intensity (1) and a phase-position $\theta_0$ or $\theta\pi$. A reference $f$ shows an output signal which has an intensity (1) and a phase-position $\theta_0$ or $\theta\pi$ in the normal condition. This output signal $f$ has, in the failure-state of this element, an intensity (1) and a predetermined phase-position $\theta_0$ or becomes no signal. Accordingly, since this parametron element receiving the constant current $\theta_0$)3/2) is a fail-safe AND circuit having the allowable failure-state 0 only, this can be represented by a notation "$^0\Lambda$" as shown in FIG. 14 (B). It can be deemed that the notation "$^0\Lambda$" corresponds to a constant $\theta_0(3/2)$.

Table 2 shows fail-safe logical circuits formed by the use of parametron elements in accordance with the above-mentioned principle. In this Table 2, significant matters are the intensity and phase-position of the constant signal. An input signal $^0x$ indicated in the first lateral line with respect to a delay circuit having only an allowable failure state 0 shows that this notation $^0x$ indicates that an input signal failed into the state 1 cannot be connected to this delay circuit. An input signal $^1x$ indicated in the second lateral line with respect to a delay circuit having only an allowable failure-state 1 shows similarly that the input signal has an allowable failure-state 1.

We can understand from contents of the above description that any input signal of any fail-safe logical circuit has to have only one allowable failure-state 0 or 1 to make an entire logical system using the fail-safe logical circuit to give fail-safe function. In this case, an input signal having only an allowable failure state 0 means no signal or a signal having a phase-position $\theta_0$ and an intensity (1), and an input signal having only an allowable failure state 1 means a signal having a phase-position $\theta\pi$ and an intensity (1).

TABLE 2

| | Prime logic | Construction | Notation |
|---|---|---|---|
| 1 | Delay circuit having only an allowable failure state "0". | $^0x$ — $\theta_0\left(\frac{1}{2}\right)$ — | $^0x$ — $^0D$ — |
| 2 | Delay circuit having only an allowable failure state "1". | $^1x$ — $\theta_\pi\left(\frac{1}{2}\right)$ — | $^1x$ — $^1D$ — |
| 3 | NOT circuit having only an allowable failure state "0". | $^1x$ ———\|——— | $^1x$ ———\|——— |
| 4 | NOT circuit having only an allowable failure state "1'. | $^0x$ ———\|——— | $^0x$ ———\|——— |
| 5 | AND circuit having only an allowable failure state "0". | $^0x_1$, $^0x_2$ → $\theta_0\left(\frac{3}{2}\right)$ | $^0x_1$, $^0x_2$ → $^0A$ |
| 6 | AND circuit having only an allowable failure state "1". | $^1x_1$, $^1x_2$ → $\theta_0\left(\frac{1}{2}\right)$ | $^1x_1$, $^1x_2$ → $^1A$ |
| 7 | OR circuit having only an allowable failure state "0". | $^0x_1$, $^0x_2$ → $\theta_\pi\left(\frac{1}{2}\right)$ | $^0x_1$, $^0x_2$ → $^0V$ |
| 8 | OR circuit having only an allowable failure state "1". | $^1x_1$, $^1x_2$ → $\theta_\pi\left(\frac{3}{2}\right)$ | $^1x_1$, $^1x_2$ → $^1V$ |

A notation———|———used in the third and fourth lateral line with respect to NOT circuits having only an allowable failure state 0 or 1 means reversal of phase position, that is, the phase position $\theta_0$ or $\theta_\pi$ of an input signal $\underline{x}$ is reversed to the phase position $\theta\pi$ or $\theta_0$. These NOT circuits have different input signals ${}^1x$ or ${}^0x$ in accordance with different fail-safe states 0 and 1.

An AND circuit listed in the fifth lateral line has, as mentioned with reference to FIGS. 14 (A) and 14 (B), an output signal which has a phase-position $\theta\pi$ in an only case where both the input signals $x_1$ and $x_2$ have a phase-position $\theta\pi$. This output signal assumes a phase-position $\theta_0$ or no signal in other all cases. Moreover, the allowable failure-state of any input signal is the state 0 that is no signal or a signal having the phase position $\theta_0$.

An AND circuit listed in the sixth lateral line has an output signal which has a phase-position, similarly as the AND circuit of the fifth lateral line, in an only case where both the input signals $x_1$ and $x_2$ have a phase position $\theta\pi$. However, the allowable failure-state of any input signal is the state I that is no signal or a signal having the phase-position $\theta\pi$. This oscillation phase of this circuit is determined by the phase position $\theta_0$ of constant current only when the two input signals $x_1$ and $x_2$ becomes simultaneously no signal, so that the output signal in this case has a phase-position $\theta_0$. This AND circuit meets requirements for a 1-typed fail-safe AND circuit having an allowable failure state 1 except a rare case where two input signals $x_1$ and $x_2$ become simultaneously no signal.

An OR circuit listed in the seventh lateral line has an output signal having a phase-position $\theta\pi$ in case where either or both input signal $x_1$ or/and $x_2$ has or have a phase-position $\theta\pi$. These operations meet conditions for an OR circuit. Moreover, if either the input signal $x_1$ or $x_2$ becomes no signal, this OR circuit generates an output signal having a phase-position determined by a remaining input signal. This condition meets requirements for a 0-typed OR circuit having an allowable failure-state 0 only. However, if the two input signals $x_1$ and $x_2$ become simultaneously no signal, this OR circuit generates an output signal having a phase-position $\theta\pi$ determined by the phase position $\theta$ of the constant current. Accordingly, this OR circuit meets requirements for a 0-typed fail-safe OR circuit having an allowable failure-state 0 except a rare case where two input signals $x_1$ and $x_2$ become simultaneously no signal. The allowable failure-state of the input signals $x_1$ and $x_2$ is the state 0.

An OR circuit listed in the eighth lateral line has an output signal having a phase-position $\theta\pi$ either the input signal $x_1$ or $x_2$ the input signals $x_1$ and $x_2$ has or have a phase-position $\theta\pi$. Moreover if the input signal $x_1$ or $x_2$ or both the input signals $x_1$ and $x_2$ becomes or simultaneously become no signal, the output signal has a phase-position $\theta\pi$ or becomes no signal These conditions meet requirements for a 1-typed OR circuit having an allowable failure-state 1 only.

As understood from the above details, the above-mentioned fail-safe logical circuits using parametron elements have a feature that means for applying a seed signal (a constant signal having a predetermined phase-position $\theta_0$ or $\theta\pi$) to the oscillation circuit of the parametron element is provided separately from information input means ($I_1$, $I_2$, —), a feature that the intensity of this seed signal is established between intensities (0) and (1) or intensities (1) and (2) in a case of two input signals, where it is assumed that the input signal has an intensity (1). Moreover, the phase-position of the seed signal is determined in accordance with prime logic of the logical circuit. If the number $n$ of input signals more than two are applied to the logical circuit, the intensity of the seed signal (the constant signal) is established between intensities (0) and (1) or intensities (1) and (n). As the result of such construction and conditions, the logical circuit meets requirements for a fail-safe logical elemental circuit which generates, in a case of fault of the self circuit or an immediately preceding circuit, no output signal or an output signal having a predetermined phase-position. The above-mentioned fail-safe logical circuit meets substantially requirements for fail-safe conditions in a case of any fault of all means except the fault of excitation source.

In the above descriptions, the parametron element is formed by the use of ferromagnetic substance. However, the above-mentioned fail-safe logical circuit can be formed by parametric resonators using ferrodielectric or variacapacity of semiconductor.

We claim:

1. In a fail-safe logical system including a fail-safe logical unit embodying fail-safe logical elemental circuits, wherein said system generates a predetermined logical output upon failure of any element of any of said elemental circuits, the improvement comprising:

first input circuit means having a predetermined logical function and having means for generating only an 0 output condition upon entry of said first input circuit means into a failure state; and second input circuit means, having the same predetermined logical function as said first input circuit means, and having means for generating only a 1 output condition upon entry of said second input circuit means into a failure-state and in which said first and second input circuit means are connected to said fail-safe logical unit.

2. A fail-safe logical system according to claim 1, in which the logical elemental circuits are connected in an alternate, cascade circuit arrangement, wherein at least one of said logical elemental circuits comprises a NOT circuit, and wherein the logical elemental circuits connected respectively to the input and output of each said NOT circuit have opposite 1 and 0 failure-states.

3. A fail-safe logical system according to claim 1, in which a pair of said logical elemental circuits comprise means for performing the same function and have different failure-states 0 and 1, respectively, from each other, and in which said logical elemental circuits include error detecting circuit means connected to said pair of logical elemental circuits, for detecting whether said pair of circuits have the same output state.

4. A fail-safe logical system according to claim 1, in which one of said fail-safe elemental circuits is a parametron element having input means, and further comprising signal means connected to said parametron element for applying a constant signal to said separate oscillation circuit, the constant signal having a predetermined phase-position 0 or $\pi$ with respect to a signal at said input means, and for applying an effective field to said parametron having an intensity which differs from the normal intensity of a field caused by input signals applied to the input means.

5. A fail-safe logical system according to claim 4, in which the constant signal is commonly applied to a plurality of parametron elements.